US010534752B2

(12) United States Patent
Smith et al.

(10) Patent No.: US 10,534,752 B2
(45) Date of Patent: *Jan. 14, 2020

(54) SESSION-BASED PROCESSING METHOD AND SYSTEM

(71) Applicant: Versata Development Group, Inc., Austin, TX (US)

(72) Inventors: Shawn A. P. Smith, Austin, TX (US); Daniel P. Karipides, Round Rock, TX (US)

(73) Assignee: Versata Development Group, Inc., Austin, TX (US)

(*) Notice: Subject to any disclaimer, the term of this patent is extended or adjusted under 35 U.S.C. 154(b) by 260 days.

This patent is subject to a terminal disclaimer.

(21) Appl. No.: 15/637,306

(22) Filed: Jun. 29, 2017

(65) Prior Publication Data
US 2017/0300506 A1    Oct. 19, 2017

Related U.S. Application Data

(63) Continuation of application No. 14/082,690, filed on Nov. 18, 2013, now Pat. No. 9,720,918, which is a (Continued)

(51) Int. Cl.
*G06F 16/13* (2019.01)
*G06F 16/11* (2019.01)
(Continued)

(52) U.S. Cl.
CPC .......... *G06F 16/13* (2019.01); *G06F 11/3006* (2013.01); *G06F 11/3438* (2013.01);
(Continued)

(58) Field of Classification Search
CPC combination set(s) only.
See application file for complete search history.

(56) References Cited

U.S. PATENT DOCUMENTS 5,307,351 A * 4/1994 Webster .................... H04J 3/14
                                                      370/470
5,487,066 A    1/1996 McNamara et al.
(Continued)

OTHER PUBLICATIONS

Cormen, Thomas H. et al., "Introduction to Algorithms," MIT Press, 1990, pp. 203-208, 221-226, 243-246.
(Continued)

*Primary Examiner* — Shyue Jiunn Hwa
(74) *Attorney, Agent, or Firm* — Terrile, Cannatti & Chambers; Michael Rocco Cannatti

(57) ABSTRACT

A log file processing system sorts records from large log files and groups them by session without making a complete copy of the log files by capturing a subset of the log files in a sliding memory window and identifying all records in the window that form a complete user session. Records belonging to a complete session are output for analyzing, and the remaining records are output as raw log data for additional processing. Using a ring buffer to implement the sliding memory window, data structures are used to group records by session, to identify completed sessions, and to index into the ring buffer to retrieve records for completed sessions that are to be directly analyzed. Any records remaining in the ring buffer at the end of slide window processing may be output as raw log file data and are processed as incomplete or malformed session records. An embodiment of the log file processing system provides a significant improvement on the speed of data extraction from log files into analyzable session data.

9 Claims, 5 Drawing Sheets

Related U.S. Application Data continuation of application No. 12/856,297, filed on Aug. 13, 2010, now Pat. No. 8,589,428, which is a continuation of application No. 10/796,317, filed on Mar. 9, 2004, now Pat. No. 7,779,021.

(51) Int. Cl.
*G06F 11/34* (2006.01)
*G06Q 30/02* (2012.01)
*H04L 29/06* (2006.01)
*G06F 11/30* (2006.01)
*H04L 29/08* (2006.01)

(52) U.S. Cl.
CPC .......... *G06F 11/3476* (2013.01); *G06F 16/11* (2019.01); *G06Q 30/02* (2013.01); *H04L 63/1425* (2013.01); *H04L 67/22* (2013.01); *G06F 2201/875* (2013.01)

(56) References Cited

U.S. PATENT DOCUMENTS

| | | | |
|---|---|---|---|
| 5,765,143 A | 6/1998 | Sheldon et al. | |
| 6,363,421 B2* | 3/2002 | Barker | H04L 41/0213 709/202 |
| 6,393,479 B1 | 5/2002 | Glommen et al. | |
| 6,470,324 B1 | 10/2002 | Brown et al. | |
| 6,711,550 B1 | 3/2004 | Lewis et al. | |
| 6,826,697 B1 | 11/2004 | Moran | |
| 6,944,136 B2 | 2/2005 | Kim et al. | |
| 6,965,634 B1 | 11/2005 | Clark | |
| 7,107,338 B1 | 9/2006 | Nareddy et al. | |
| 7,114,045 B1 | 9/2006 | Pliss et al. | |
| 7,181,731 B2 | 2/2007 | Pace et al. | |
| 7,359,935 B1 | 4/2008 | Karipides et al. | |
| 7,657,448 B2 | 2/2010 | Reddy et al. | |
| 7,885,803 B2 | 2/2011 | Nuzman et al. | |
| 2002/0016771 A1 | 2/2002 | Carothers et al. | |
| 2002/0099806 A1 | 7/2002 | Balsamo et al. | |
| 2002/0099843 A1 | 7/2002 | Fruchtman et al. | |
| 2002/0129368 A1 | 9/2002 | Schlack et al. | |
| 2002/0188534 A1 | 12/2002 | Brady | |
| 2003/0061541 A1 | 3/2003 | Kaler et al. | |
| 2003/0088545 A1 | 5/2003 | Subramaniam et al. | |
| 2003/0172198 A1* | 9/2003 | Tiwary | G06F 11/3414 710/1 |
| 2003/0188035 A1 | 10/2003 | Lubbers et al. | |
| 2004/0100952 A1 | 5/2004 | Boucher et al. | |
| 2004/0117358 A1 | 6/2004 | von Kaenel et al. | |
| 2004/0221311 A1 | 11/2004 | Dow et al. | |
| 2005/0154990 A1 | 7/2005 | Bodin et al. | |
| 2009/0132579 A1* | 5/2009 | Kwang | H04L 67/22 |

OTHER PUBLICATIONS http://www.http-analyze.org, A Log Analyzer for Web Servers, printed Mar. 11, 2004.

\* cited by examiner

SESSION-BASED PROCESSING METHOD AND SYSTEM

BACKGROUND OF THE INVENTION

Field of the Invention

The present invention relates in general to the field of information processing. In one aspect, the present invention relates to a system and method for collecting and analyzing Internet website traffic.

Description of the Related Art

Most website servers can be configured to store information in a log file for every website page request they receive. Statistics concerning every request for a page from the website are recorded in the log file in a linear log file format, where each request is logged separately from each other request, and the requests are logged in approximately chronological order. The log file is a record that can be analyzed to produce a website traffic report. The statistics typically include date, time of day, browser location, type of request, uniform resource identifier, referring link, cookie or session identification, and the like. The creation of the log file will occur automatically, as html documents are requested by browsers accessing the website server. The log file can be analyzed to process and summarize the collected statistics. The steps for retrieving hyper text markup language ("HTML") documents from a website server that includes a logging function are as follows. First, a web browser sends a request to a website server for an html document. Next, the website server receives the request from the browser. The website server then returns the requested html document to the web browser. Finally, the website server logs the transaction to a log file.

As a result of the foregoing, a log file for a website server may contain statistical information for a variety of different users and sessions. For example, an example log file containing ten web server requests from four different client web browsers might include the following data:

| date | time | ip | method | uri-stem | cookie |
|---|---|---|---|---|---|
| 2001 Feb. 27 | 00:23:00 | 192.168.11.226 | GET | /agn/LoadingPage.html | sessionid=a562 |
| 2001 Feb. 27 | 00:23:00 | 192.168.11.226 | GET | /agn/lib/DOMLevel2.js | sessionid=a562 |
| 2001 Feb. 27 | 00:30:17 | 192.168.24.245 | GET | /agn/logon.jsp | sessionid=b828 |
| 2001 Feb. 27 | 01:06:59 | 192.168.11.226 | GET | /agn/LoadingPage.html | sessionid=a562 |
| 2001 Feb. 27 | 02:10:17 | 10.0.48.179 | GET | /agn/logon.jsp | sessionid=c437 |
| 2001 Feb. 27 | 02:17:19 | 10.0.48.179 | GET | /agn/LoadingPage.html | sessionid=c437 |
| 2001 Feb. 27 | 02:27:27 | 10.0.48.180 | GET | /agn/images/down.gif | sessionid=d140 |
| 2001 Feb. 27 | 02:36:42 | 10.0.48.179 | GET | /agn/JavaScript/grid.js | sessionid=c437 |
| 2001 Feb. 27 | 03:25:50 | 10.0.48.180 | GET | /reports/ak013/order.gif | sessionid=d140 |
| 2001 Feb. 27 | 03:56:30 | 192.168.11.226 | GET | /agn/images/logo.gif | sessionid=a562 |

A simple analysis of this example log file will examine each line in the log file sequentially, keeping only summary information as the processing moves from one line to the next. For example, an analysis of this type might calculate the following pieces of summary information:

There were 3 client requests to the web server in the first hour (between 00:00:00 and 01:00:00).

There was 1 client request to the web server in the second hour (between 01:00:00 and 02:00:00).

There were 4 client requests to the web server in the third hour (between 02:00:00 and 03:00:00).

There were 2 client requests to the web server in the fourth hour (between 03:00:00 and 04:00:00).

There were visits from 4 distinct IP address (web client machines).

URIs beginning with "/agn" were visited 9 times.

URIs beginning with "/reports" were visited once.

In a more sophisticated analysis of the log file, more detailed information may be collected at the session level. Such an analysis will use some method (such as a cookie, IP address, or other identifier) to determine which requests belong to the same user session. It will then examine all records relating to the same session together to gather a complete and detailed picture of the actions performed by each individual user.

To do this analysis at the session level, it is often helpful to group log file records for the same session together, then process each group of records session-by-session. For example, the log file records described above would be grouped as follows:

| date | time | ip | method | uri-stem | cookie |
|---|---|---|---|---|---|
| | | | Group 1 | | |
| 2001 Feb. 27 | 00:23:00 | 192.168.11.226 | GET | /agn/LoadingPage.html | sessionid=a562 |
| 2001 Feb. 27 | 00:23:00 | 192.168.11.226 | GET | /agn/lib/DOMLevel2.js | sessionid=a562 |
| 2001 Feb. 27 | 01:06:59 | 192.168.11.226 | GET | /agn/LoadingPage.html | sessionid=a562 |
| 2001 Feb. 27 | 03:56:30 | 192.168.11.226 | GET | /agn/images/logo.gif | sessionid=a562 |
| | | | Group 2 | | |
| 2001 Feb. 27 | 00:30:17 | 192.168.24.245 | GET | /agn/logon.jsp | sessionid=b828 |
| | | | Group 3 | | |
| 2001 Feb. 27 | 02:10:17 | 10.0.48.179 | GET | /agn/logon.jsp | sessionid=c437 |
| 2001 Feb. 27 | 02:17:19 | 10.0.48.179 | GET | /agn/LoadingPage.html | sessionid=c437 |
| 2001 Feb. 27 | 02:36:42 | 10.0.48.179 | GET | /agn/JavaScript/grid.js | sessionid=c437 |
| | | | Group 4 | | |
| 2001 Feb. 27 | 02:27:27 | 10.0.48.180 | GET | /agn/images/down.gif | sessionid=d140 |
| 2001 Feb. 27 | 03:25:50 | 10.0.48.180 | GET | /reports/ak013/order.gif | sessionid=d140 |

For large log files that are larger than the amount of available random access memory ("RAM"), the grouping of log file entries by session can use a lot of computational resources. For example, conventional grouping techniques involve reading the log file, request-by-request, and sorting the requests into a new file, set of files, database, or index on the file system that is structured to make locating requests in the same session fast. For example, the log files could be imported into a table in a database where each line in the log file is imported as a single record in the database, and where one of the fields in the database record identifies the session the request belongs to. With this arrangement, standard database techniques can be used to sort the table by the session field and then read the records out of the database in session field order. However, this technique requires creating an extra copy of the log file and also significant processing speed penalties in the time required for extracting data from the log files for storage in a database.

Therefore, a need exists for methods and/or apparatuses for improving the processing of log file records to quickly and efficiently transfer data to a session history database. Further limitations and disadvantages of conventional systems will become apparent to one of skill in the art after reviewing the remainder of the present application with reference to the drawings and detailed description which follow.

SUMMARY OF THE INVENTION

In accordance with one or more embodiments of the present invention, a system and method are provided for grouping and processing log file entries using a memory window to select a subset of the log file records for identifying complete session records that may be analyzed or parsed, and for otherwise identifying incomplete session records for subsequent processing. By storing a subset of the log file data in a ring buffer, complete sessions within the data subset may be identified and grouped for processing without having to make a complete copy of the log file. In one embodiment, selected data structures are used to process the subset of raw log file data to generate log file entries grouped by session. The selected data structures may also be used to generate groups of log file entries for incomplete or defective sessions that are output for subsequent processing. In addition, selected data structures may be used to generate groups of log file entries for sessions that ended after the last entry in the log file.

In one embodiment of the present invention, a method of processing web server logs a session at a time includes receiving a stream of raw log file data that is substantially chronologically ordered. By storing a subset of the data for processing in a memory-efficient manner, any complete sessions within the subset may be identified and grouped, and any incomplete sessions may also be identified. Log file entries from the data subset for a complete session may then be output for parsing or further analysis. Log file entries from the data subset that have not been indexed to a complete user session may also be identified and stored for additional processing or combination with the processing results from a second subset of log file data.

The objects, advantages and other novel features of the present invention will be apparent from the following detailed description when read in conjunction with the appended claims and attached drawings.

DETAILED DESCRIPTION

A method and apparatus for memory-efficient session-based log file processing is described. While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the data processing arts to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as "processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Figure 1:
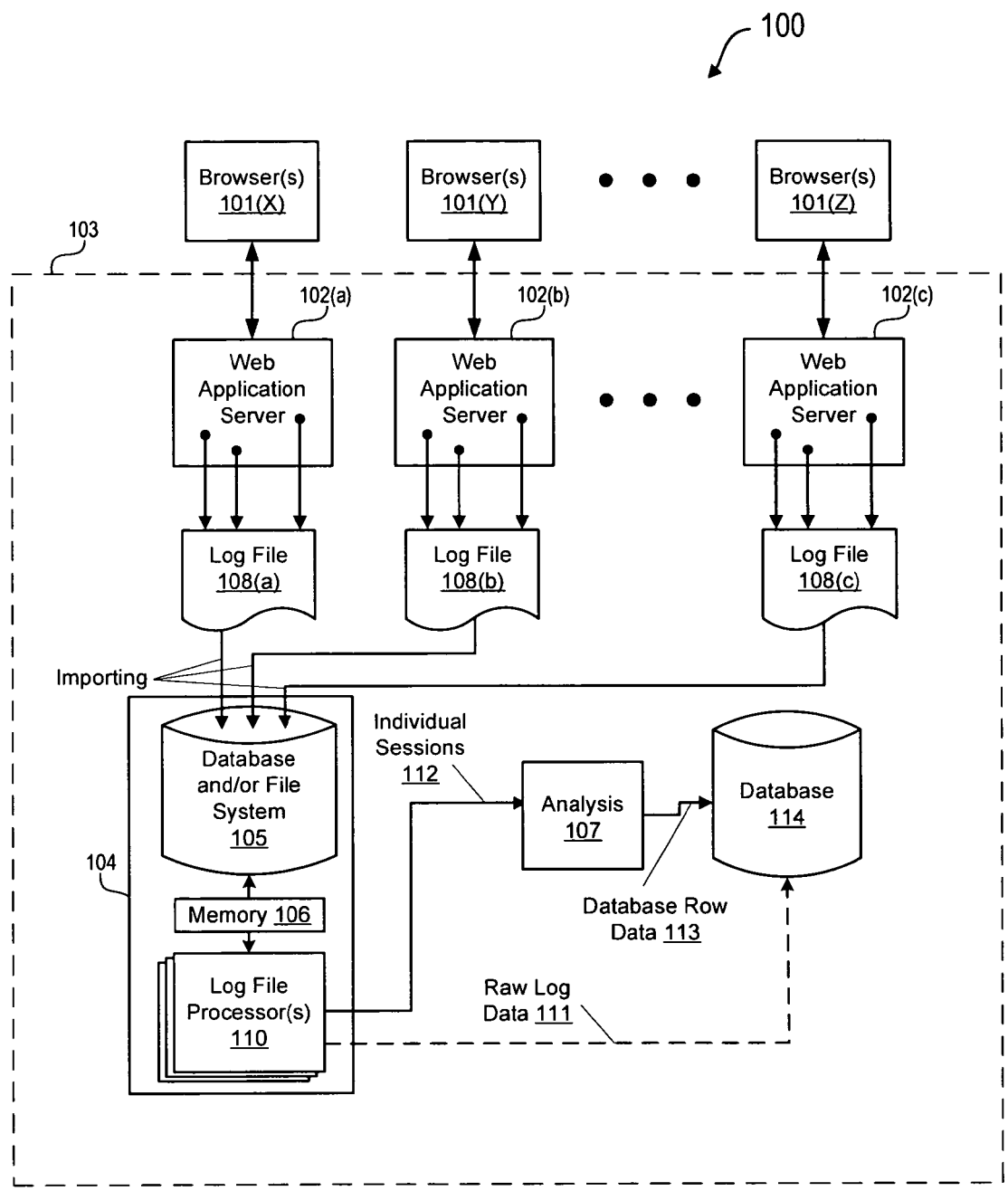
FIG. 1 depicts an exemplary computer system that provides session-based processing of log files.

Referring now to FIG. 1, a block diagram illustrates a network environment 100 in which the present invention may be practiced. Network 100 (e.g. a private wide area network (WAN) or the Internet) includes a number of networked server computer systems 102(a)-(c) that are accessible by client computer systems 101(x)-(z) that are connected to the network. Communication between client computer systems 101(x)-(z) and server computer systems 102(a)-(c) typically occurs over a network, such as a public switched telephone network over asynchronous digital subscriber line (ADSL) telephone lines or high-bandwidth trunks, for example communications channels providing T1 or OC3 service. Client computer systems 101(x)-(z) typically access server computer systems 102(a)-(c) through a service provider, such as an internet service provider ("ISP") by executing application specific software, commonly referred to as a browser, on one of client computer systems 101(x)-(z).

In a selected embodiment, the network 100 is a web system in which a session recording and analysis system 103 captures historical information surrounding a user's web site session using log files 108 to capture direct user interactions passed between the web server (e.g., 101a) and a browser (e.g., 102a), as well as information from the web site's server-side application layers. The system 103 includes any number of web application servers 102, with each specific web application server being denoted by a parenthetical letter. Each web application server 102 writes records to a log file 108. In one embodiment, each web application server 102 writes records to a separate log file, i.e. web application server 102(a) writes to log file 108(a). In another embodiment, each web application server 102 writes to the same log file. Additional details concerning the system 103 are described in U.S. patent application Ser. No. 10/324,764, entitled "Generating Contextual User Network Session History In a Dynamic Content Environment," filed Dec. 20, 2002, which is incorporated herein by reference in its entirety.

Capturing user session information and recording the information in records is one part of the process of assembling a useful user session history. Another part is analyzing the assembled records. A single user may generate a large amount of information, and multiple users can generate extensive data for storage in the log files 108. As a result, parsing and other analysis of the user data is greatly assisted by processing the log file data to assure that the recorded data is complete and accurate, and to detect interrelationships between the records which can be evaluated using a set of predetermined rules, and to otherwise validate the records.

To assist with log file processing, a computer system 104 provides session-based processing of log files. The computer system 104 may be found in many forms including, for example, mainframes, minicomputers, workstations, servers, personal computers, internet terminals, notebooks, wireless or mobile computing device (including personal digital assistants), embedded systems and other information handling systems, which are designed to provide computing power to one or more users, either locally or remotely. A computer system 104 includes one or more microprocessor or central processing units (CPU) 110, mass storage memory 105 and local RAM memory 106. The processor 110, in one embodiment, is a 32-bit or 64-bit microprocessor manufactured by Motorola, such as the 680X0 processor or microprocessor manufactured by Intel, such as the 80X86, or Pentium processor, or IBM. However, any other suitable single or multiple microprocessors or microcomputers may be utilized. In a selected embodiment, a multiprocessor configuration is provided for enabling multi-threaded processing, whereby one thread or processor is used for processing records in the sliding window (described below) into session groups, while another processor is used to analyze or parse the grouped records. Computer programs and data are generally stored as instructions and data in mass storage 105 until loaded into main memory 106 for execution. Main memory 106 may be comprised of dynamic random access memory (DRAM). As will be appreciated by those skilled in the art, the CPU 110 may be connected directly (or through an interface or bus) to a variety of peripheral and system components, such as a hard disk drive, cache memory, traditional I/O devices (such as display monitors, mouse-type input devices, floppy disk drives, speaker systems, keyboards, hard drive, CD-ROM drive, modems, printers), network interfaces, terminal devices, televisions, sound devices, voice recognition devices, electronic pen devices, and mass storage devices such as tape drives, hard disks, compact disk ("CD") drives, digital versatile disk ("DVD") drives, and magneto-optical drives. The peripheral devices usually communicate with the processor over one or more buses and/or bridges. Thus, persons skilled in the art will recognize that the foregoing components and devices are used as examples for sake of conceptual clarity and that various configuration modifications are common.

In accordance with a selected embodiment, the methods and systems for efficiently grouping entries in a log file as shown and described herein may be implemented in software stored on a computer-readable medium and executed as a computer program on a general purpose or special purpose computer. The processing of session-based log files, for example, can be implemented in a database application, such as Trilogy Software's Automotive Demand Intelligence suite of products. For clarity, only those aspects of the software germane to the invention are described, and product details well known in the art are omitted. For the same reason, the computer hardware is not described in further detail. It should thus be understood that the invention is not limited to any specific computer language, program, or computer.

FIG. 1 depicts a technique for processing the entries in a large log file stored in a mass storage device 105 by grouping a subset of the entries in RAM 106 in a memory-efficient manner, even when the source log files are much bigger than the amount of available RAM. As a result, entries for complete user sessions are identified without needing to build an index on the file system 105 and without making a complete copy of the log file in a new, reorganized format. The identified records for complete user sessions 112 can then be passed to an analysis or parsing component 107 for additional analysis to generate a history of the individual user session that may be stored in a database 114. As will be appreciated by persons having ordinary skill in the art, parsing refers to the performance of any trivial or complex parsing and/or analysis on the records associated with a session as a whole, and refers generally to any processing that might occur in the analysis component 107.

Figure 2:
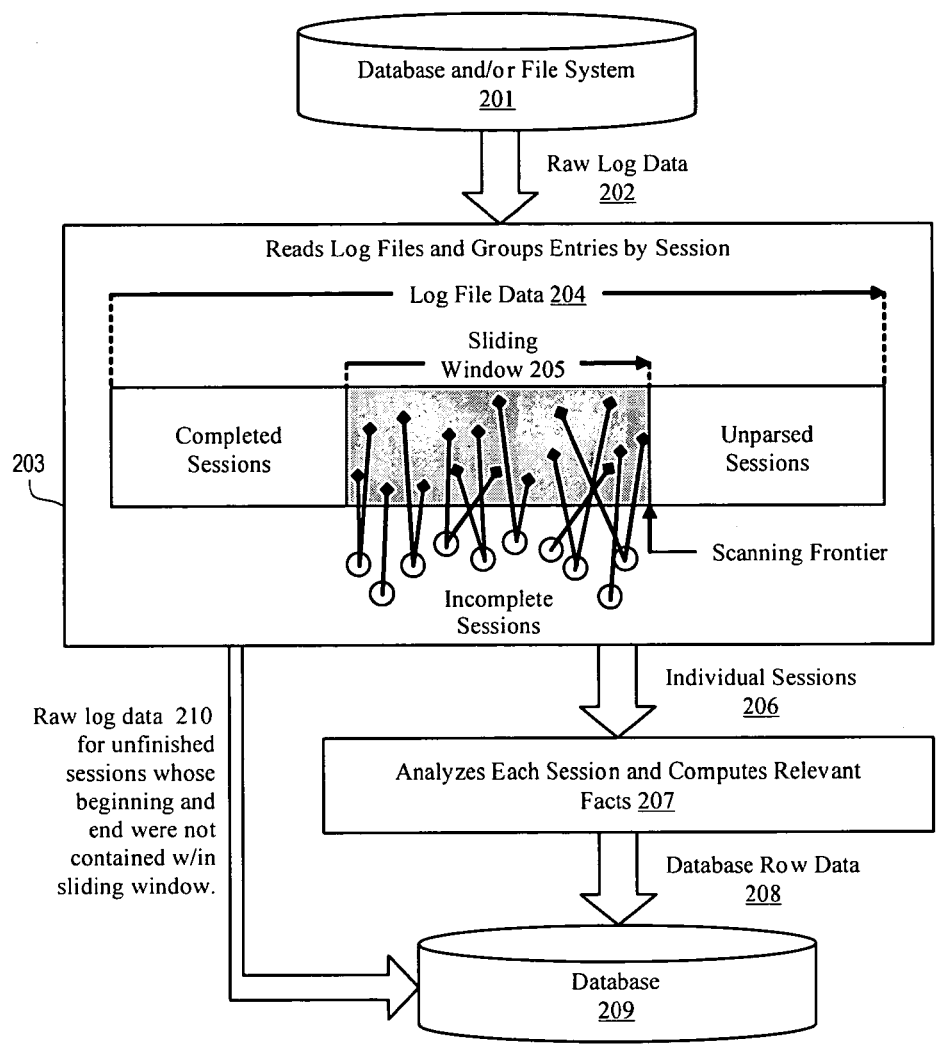
FIG. 2 illustrates an exemplary embodiment of processing log files using a sliding window.

Complete user sessions from the log file data contained in database and/or file system 105 are identified and grouped by processing only a subset of the log file data at a time. An exemplary embodiment is illustrated in FIG. 2, which shows an overview of how log files are processed using a sliding window to read log files and group entries by session. In this example, a log file processor 203 uses a sliding window 205 on the log file contents 201 so that, at any one time, a substantial portion of the log file 204 is loaded into memory window 205, where this portion may be programmably controlled and adjusted to optimize the performance of the log file processing. The contents of the log file loaded into the window 205 are scanned and read, line by line. The entries are then indexed by the session they belong to. If, at any time, the processor 203 discovers that all log file entries for a given session are present within the current window 205, these log file entries are gathered together and passed off to a component that analyses the individual session 206, end-of-session entry to the log file (e.g., 108(*a*)). As the log file processor 203 reads the entries in the log file, it can use these assumptions to recognize the last request for a given session.

In addition to using "session-end"-type entries, the log file processor 203 can use other criteria to identify the last log file line for a given session, especially since web servers do not always write out log file entries in strict chronological order. For example, a multi-threaded web server can have two or more threads simultaneously handling different requests for the same session, and the order of the log entries for those requests is not necessarily guaranteed. To handle this gracefully, a selected embodiment of the present invention uses the "session-end"-type entries to identify the session as a candidate for expiration. The session will not actually be considered complete until after a predetermined time period has elapsed since the "session-end"-type entry.

As illustrated in FIG. 2, the input to the log file processor 203 is a stream of raw log file data 204 from the database and/or file system 201, ordered in approximately chronological order. While the log file data 204 does not have to be in strict chronological order, the deviations from strict chronological order are small enough that a scanning algorithm does not falsely identify the last entry for a session, when in fact there is a subsequent entry that belongs to that session. For example, if the scanning algorithm were configured so that a session has definitely expired after forty minutes of inactivity, the following out-of-order sequence of log file entries would be illegal:

| date | time | ip | method | uri-stem | cookie |
| --- | --- | --- | --- | --- | --- |
| 2001 Feb. 27 | 00:21:30 | 192.168.11.226 | GET | /agn/logon.jsp | sessionid=a562 |
| 2001 Feb. 27 | 00:23:00 | 192.168.11.226 | GET | /agn/catalog.jsp | sessionid=a562 |
| 2001 Feb. 27 | 01:30:17 | 192.168.24.245 | GET | /agn/logon.jsp | sessionid=b828 |
| 2001 Feb. 27 | 00:26:59 | 192.168.11.226 | GET | /agn/purchase.jsp | sessionid=a562 | such as an analysis component 207. The computational and/or parsing results 208 may then be stored in database 209.

If the individual log file entries for a given session are scattered through the log file 204 such that all entries are never present at one time within the sliding window (e.g., 205), that session cannot be directly analyzed or parsed. This can occur, for example, when the beginning and the end entries for the session are very far apart in the log file 204, so that by the time the end record becomes visible within the window 205, the beginning record is no longer included within the window 205. Alternatively, the log file 204 may not include the end entry for a session because the log file ends at a point in time before the last entry for the session was made (the last entry will be present in some future log file). Log file entries for such incomplete sessions may be identified and sorted for separate processing using conventional techniques, or may be combined with incomplete session entries that are identified in a previous or subsequent memory window.

The determination of whether all log file entries for a given session are present within a given window can be based upon a variety of predetermined rules or criteria that define the beginning and end points for a user session. For example, session end events can be defined to occur after a predetermined amount of inactivity (such as thirty minutes since the last request to the server) and/or when a user visits the "Logout" page. When a session ends, the web server (e.g., 102(*a*) in FIG. 1) can be configured to write an In this example, the third and fourth entries in the log file are out-of-order, such that the time difference between the second and third entries is greater than forty minutes. The scanning algorithm could be constructed to assume that, since more than forty minutes passed between the second and third entries, the second entry must be the last entry for session "a562", when in fact the fourth entry is also associated with session "a562." The expiration value may be selected based upon observed user behavior to balance the desire to capture complete user sessions with the need to conclude the data scanning phase so that session parsing operations can begin.

After identifying and grouping log file entries from the window 205, the log file processor 203 generates individual session data 206 that includes the log file entries for, completed sessions that were included within the memory window 205, grouped together by session. The log file data for each complete session may be directly parsed and/or otherwise analyzed 207 to obtain a detailed understanding of the user history and actions for storage in the user history database 209.

In the example system depicted in FIG. 2, the log file processor 203 may also output raw log data 210 for unfinished sessions whose beginning and end entries were not contained within the sliding memory window 205. As illustrated, the raw log data for incomplete sessions may be stored in the database 209, or may instead be retained in the database and/or file system 201 for subsequent processing by the log file processor 203. It will be appreciated that the scanning algorithm for the log file processor 203 may use a variety of rules for identifying unfinished session records contained within the log file window 205.

One example of a rule for identifying output raw log data is to generate raw log file entries for sessions that belong to very long running sessions where the beginning and end entries are very far apart in the log file 204 so that they are not included in the sliding window 205. This particular outcome may be obtained by collecting all records in the memory window 205 that were not identified and output as completed sessions 206. Alternatively, more selective collection techniques may be used, such as collecting records in the memory window 205 for sessions that have only (or do not have) beginning entries, or collecting records in the memory window 205 for sessions that have only (or do not have) ending entries. In a selected embodiment, the number of such incomplete sessions may be monitored and compared to a programmable threshold number to determine if the size of the sliding window is too small when the number of incomplete sessions exceeds the programmable threshold number. When the threshold is exceeded, the size of the memory window may be automatically incremented, or the processing system may issue an alert or notification indicating that the window is too small or that an adjustment to the window size is required.

In yet another embodiment, the log file processor 203 may be configured to exclude from the output file 210 entries for sessions that may have ended after the last entry in the log file. For example, consider the chronology where user session A begins at 11:30 pm, the open log file ("the first log file") is closed at 12:00 am, a new log file ("the second log file") was started, and then user session A ended at 12:30 am. In this example, a parse of only the first log file will not be able to completely process user session A. The session records identified by the log file processor 203 as belonging to user session A can be collected and put aside, and when the next day's log file (i.e., the second log file) becomes available, the previously identified records from user session A can be rescanned along with the next day's log file to complete the parse of that session.

Figure 3:
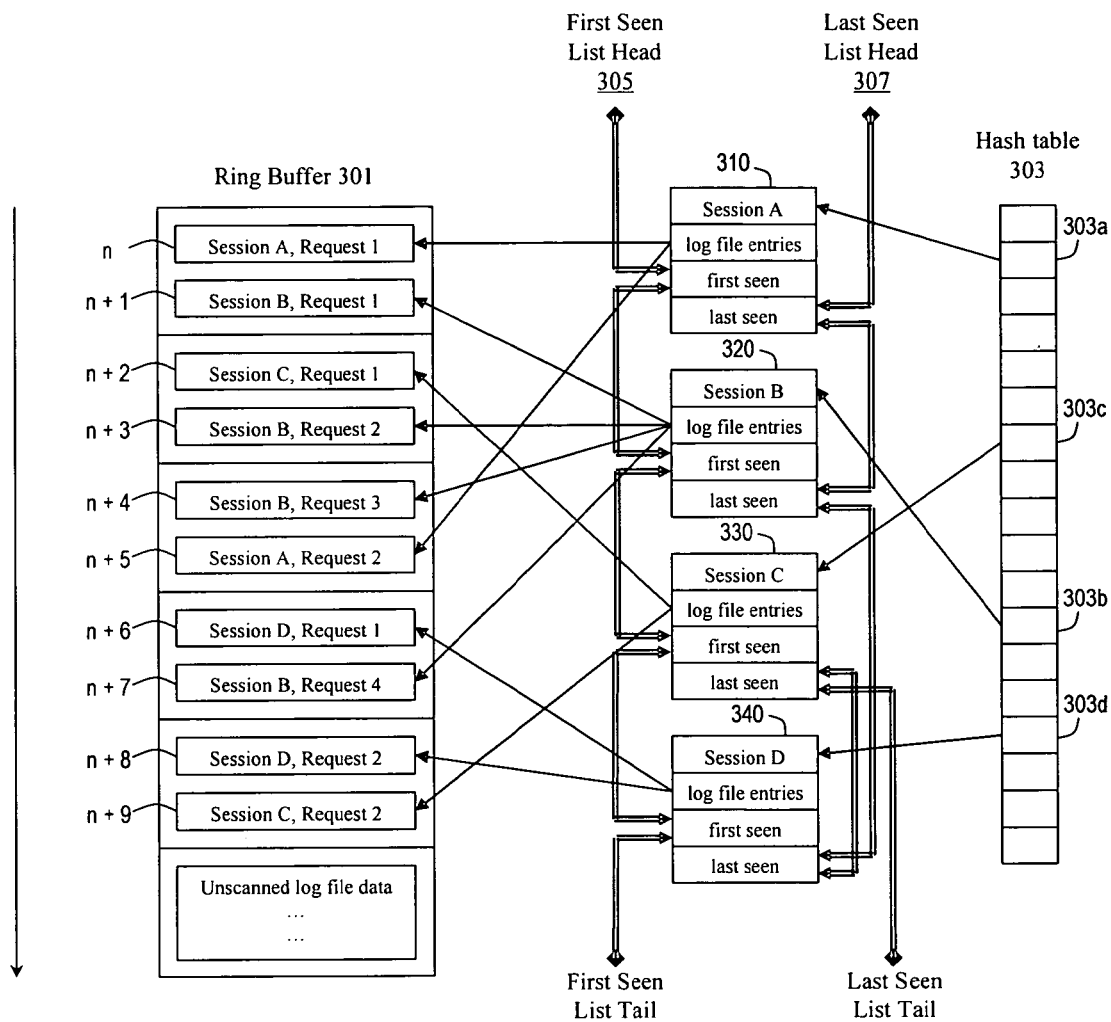
FIG. 3 illustrates an exemplary embodiment of using data structures to identify and group log files by session.

Turning now to FIG. 3, a plurality of data structures is illustrated which may be used to identify and group log files by session, including a ring buffer 301, hash table 303, "first seen" linked list 305, "last seen" linked list 307 and session records 310, 320, etc. A scanning algorithm may be executed by the log file processor to use these data structures for purposes of building an index to the raw log data stored in the file system without requiring the creation of complete copies of the entire log files.

In an exemplary implementation, the scanning algorithm uses a ring buffer 301 that is set up in the local memory (e.g., RAM 106 in FIG. 1) for use in implementing a sliding window into the contents of the log file(s) (e.g., 105). Appropriate sizing of the window will capture a large fraction of the log file to enable processing of a significant number of complete user sessions without requiring the memory and processor resources to completely index the entire log file. As illustrated, the ring buffer is loaded with a subset of the raw log data that was assembled from the log file(s) of the web server(s).

The local memory also contains session records (310, 320, 330, 340, etc.) for maintaining per-session lists of log file entries for user sessions contained in the memory window. The log file processor sets up session records to track information for scanned sessions contained within the memory window. For example, a "log file entries" field in a session record (e.g., record 310) for a particular session (e.g., Session A) may contain one or more pointers or other address indications (e.g., integer values) of where the data for that user session (e.g., Session A, Request 1 and Session A, Request 2) is located in the ring buffer (e.g., ring buffer addresses "n" and "n+5").

To locate any session record for a given session that is referenced by an entry in a log file, the local memory includes a hash table 303. As will be appreciated by those skilled in the art, a hash function is used to generate a small signature index key into the session records hash table by extracting data from the session id or using any other technique or algorithm that turns a session identifier into a fixed-size numeric index into a hash table (hash value). As illustrated in FIG. 3, the hash table 303 holds a pointer 303*a* for the session record 310 for Session A, and also holds other pointers 303*b*, 303*c*, 303*d* for the other active user session records contained in the ring buffer. As described below, the log file processor uses the hash table to index session records for a given user session for purposes of directly associating together log file entries as belonging to the same user session.

To assist with identifying log file entries for user sessions in the memory window that may be complete or have expired, a doubly linked list of "last seen" session records 307 may be stored in the local memory. The entries in this list are ordered in the sequence in which the latest individual log file entries appear in the log file. This is illustrated in FIG. 3, where the "last seen" linked list 307 points to the Session A session record, then the Session B session record, then the Session D session record, and finally the Session C session record. This sequence reflects the sequence of session record data in the buffer 301, where the last record for Session A (stored at position "n+5") precedes the last record for Session B (stored at position "n+7"), which precedes the last record for Session D (stored at position "n+8"), which precedes the last record for Session C (stored at position "n+9").

To identify sessions that will be affected when the ring buffer sliding window 205 moves forward through the log file data 204, the "first seen" linked list 305 may also be stored in local memory. The entries in this list are ordered in the sequence in which the earliest individual log file entries appear in the log file. This is illustrated in FIG. 3, where the "first seen" linked list 305 points to the Session A session record, then the Session B session record, then the Session C session record, and finally the Session D session record. This sequence reflects the sequence of session record data in the buffer 301, where the first record for Session A (stored at position "n") precedes the first record for Session B (stored at position "n+1"), which precedes the first record for Session C (stored at position "n+2"), which precedes the first record for Session D (stored at position "n+6").

The data structures for the ring buffer 301, hash table 303, session records 310, etc. and linked lists 305, 307 may be implemented with any of a variety of techniques known to those skilled in the art. For example, the hash table 303 could be replaced with a tree or a skip list. In addition, the hash table 303 may be implemented using bucket chaining. In this implementation, the hash table bucket chaining pointers may or may not be integrated into the per-session record. Also, the "last seen" linked list 307 could be ordered in the order of the timestamp of the last known request of each session, if requests are not necessarily written to the log file in strict timestamp order. The node storage for the doubly linked lists may or may not be integrated into the per-session records 310, 320, etc.

Figure 4:
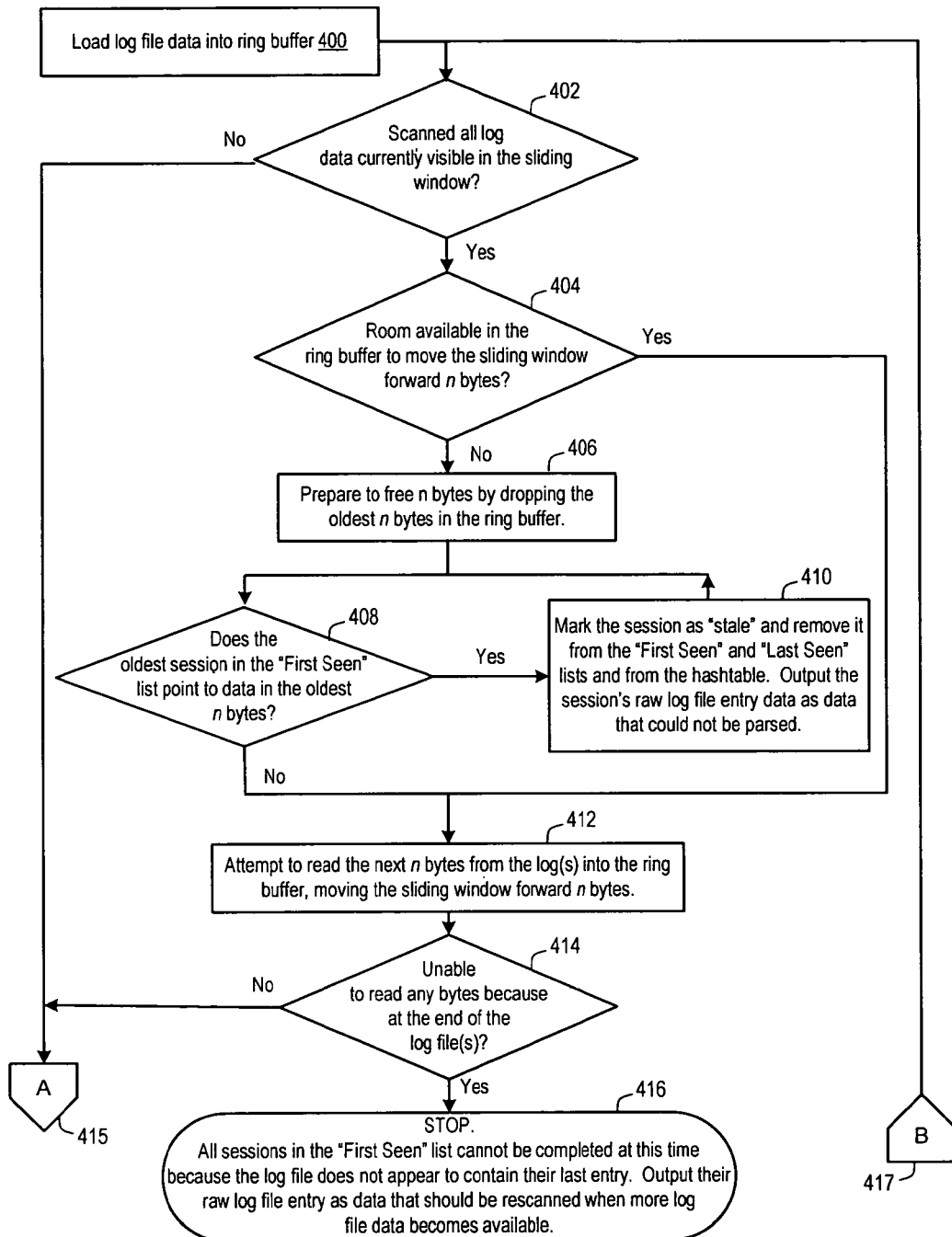
FIGS. 4 and 5 illustrate an exemplary methodology for session-based processing of log files.

Turning now to FIG. 4, an exemplary methodology for session-based processing of log files is illustrated with reference to the implementation of a sliding window with a ring buffer. The ring buffer incrementally proceeds through the log file data until such time as the end of the log file data is reached. When the sliding window reaches the end of the log file, the sessions identified in the "first seen" linked list may be treated as unfinished sessions and output as raw log data. In addition selected sessions identified in the "last seen" linked list may be treated as complete sessions and output as individual sessions to the analysis component 107.

After loading at least some of the log file data into the ring buffer (step 400), the log file processor determines whether all of the log file data contained in the sliding window has been scanned (decision 402). If data lines in the ring buffer remain to be scanned, the log file processor proceeds (via connection 415) to the sequence of steps illustrated in FIG. 5 and discussed more fully below. On the other hand, if all of the log file data in the ring buffer has been scanned, the log file processor determines whether there is room available in the ring buffer to move the sliding window forward n bytes (decision 404). For example, room may be available in the ring buffer if log file data from the sliding window did not completely fill the ring buffer, in which case new data is added to the ring buffer by reading the next n bytes of data from the log file(s). This results (at step 412) in the sliding window moving forward by n bytes.

If it is determined (at decision 404) that the ring buffer does not have room available to move forward, the log file processor attempts to delete any stale session records (and associated hash table and linked list entries) from the data structures in order to make space for new session record data contained in the next n bytes of the log file data (step 406) by dropping the oldest n bytes in the ring buffer if necessary, or by adding bytes to the ring buffer if it has not reached its maximum size. In an exemplary implementation depicted in FIG. 4, the oldest unfinished sessions are identified and removed from the data structures. For example, if it is determined that the oldest session record in the "first seen" linked list points to data in the oldest n bytes of the ring buffer (decision 408), that session is identified as a stale session, removed from the data structures and output as raw log data that cannot be directly analyzed or parsed (step 410). After the session record removal loop (steps 408, 410) is completed, the log file processor reads additional data from the log file(s) into the ring buffer (step 412), thereby moving the sliding window forward. This process is repeated until all of the data from the log files has been read into the ring buffer (decision 414) at which time all sessions identified in the "first seen" link list are incomplete sessions in this particular memory window. The log file entries for these incomplete sessions are output as raw log data that can be re-scanned when additional log file data becomes available (step 416).

Figure 5:
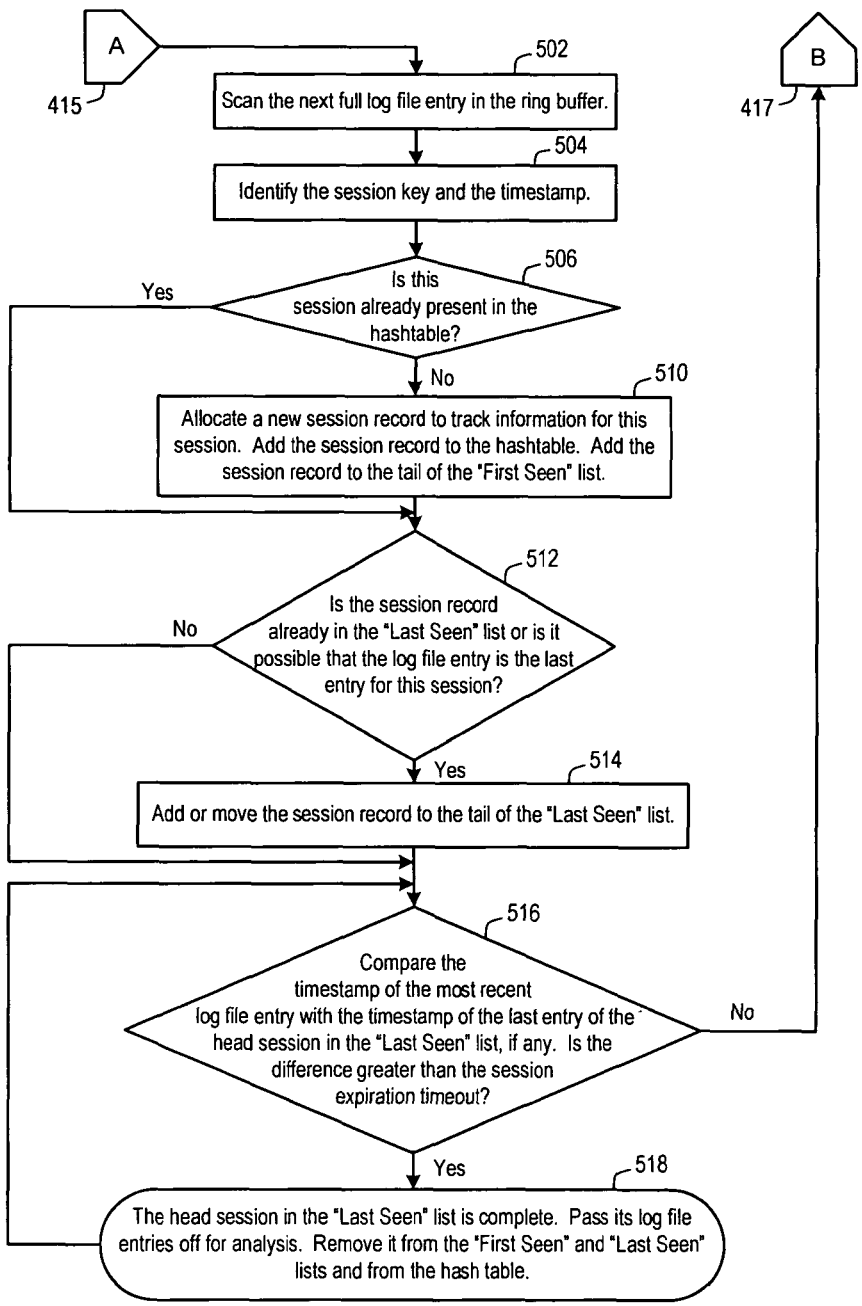

Turning now to FIG. 5, an exemplary methodology for session-based processing of log files is illustrated with reference to a process for identifying complete session records contained within the ring buffer. Upon commencement as part of ongoing scan operations (via connection 415), a line of data from the ring buffer is scanned (step 502) to identify user session identification information (such as the session key) and sort criteria (such as timestamp information) (step 504) for the scanned record. If it is determined that the record is not associated with a pending session (i.e., a session that is identified in the hash table) (decision 506), the log file processor creates a new session record in the data structures to track information for this session (step 510). In addition to creating a new session record for any new session record, the log file processor also updates the hash table with an entry identifying the new session record, and adds the new session record to the tail of the "first seen" linked list when the first session record is scanned (step 510).

After establishing that the scanned log file entry belongs to a session that is included in the hash table (either at decision 506 or step 510), the log file processor analyzes the scanned log file entry to determine if it is possible that the entry is the last entry for its session (decision 512). If not, the session record may be processed to see if it has expired (step 516), as described more fully below. Even if the data scan reveals that the log file entry may qualify as the last entry for its session (step 512), the determination need not conclusively determine that the record is actually the final entry for the session, but may instead identify the session as being a candidate for expiration, thereby allowing for entries being entered into the log file out of actual chronological sequence. This type of tentative identification of session-end records may be based on any of a variety of rules or algorithms, including but not limited to detecting if the record is a "logout" record or presuming that all log file entries could be the last entry for their session.

If the session record is already in the "last seen" linked list, or upon determining that a scanned log file entry could be the last record for the session, the data structures are updated to move the session record to the tail of the "last seen" linked list (step 514). However, the session may not conclusively be identified as complete until after a predetermined time period has elapsed since the "session-end"-type entry, as determined by an expiration check step 516. If the expiration time period has not yet expired (a negative outcome to decision 516), the entry is treated as if it is not the last entry for the session, and the log file scan process re-starts (via connection 417) so that the expiration decision may be re-evaluated at a later time. On the other hand, if the expiration time period has expired (an affirmative outcome to decision 516), the process outcome is that there will not be late-arriving entries for this session, and as a result, the scanned entry is the session-end entry.

In an exemplary implementation, the expiration check may be performed by comparing the timestamp of the pending scanned entry with the timestamp of the preceding or subsequent log file entries to determine if the time difference exceeds a timeout value. Alternatively, the timestamp of the most recent entry may be compared with the timestamp of the last entry of the head session in the "last seen" linked list, and if the difference is greater than a session expiration timeout value, the head session in the "last seen" list is identified as being complete (step 518). Whenever a session record is identified as being a complete session, the entries associated with that session are passed to the analysis component for additional processing. In particular, completed sessions identified from the "last seen" list are retrieved from the ring buffer using the data structures to index the appropriate records. Once retrieved, the index entries for that session are removed from the "first seen" linked list, "last seen" linked list and hash table data structures.

As will be appreciated by those skilled in the art, the process loop defined by the expiration check 516 and session-end entry confirmation 518 may be applied to close out the log file scan operations by identifying any pending sessions whose last entry in the ring buffer has been pending for longer than the session expiration timeout value (e.g., for over thirty minutes). Consider the example of a log file that captures entries having timestamp values between 5 am and 10 pm on a given day. If there is any session having entries that are identified in the "last seen" linked list and that have a timestamp difference with reference to the log file closing time (or the timestamp for the last entry in the log file) that exceeds the session expiration timeout value, the session is identified as a complete session and its associated records are identified from the ring buffer or otherwise grouped as a complete session and provided directly to the analysis component.

The above-discussed embodiments include software that performs certain tasks. The software discussed herein may include script, batch, or other executable files. The software may be stored on a machine-readable or computer-readable storage medium, and is otherwise available to direct the operation of the computer system as described herein and claimed below. In one embodiment, the software utilizes a local memory to implement the sliding window (such as by storing the ring buffer, session records, linked lists and hash table) in such a way that there is no need to make a complete copy of all log file records stored in the database or file system. The local memory used for storing firmware or hardware modules in accordance with an embodiment of the invention may also include a semiconductor-based memory, which may be permanently, removably or remotely coupled to a microprocessor/memory system. Other new and various types of computer-readable storage media may be used to store the modules discussed herein. Additionally, those skilled in the art will recognize that the separation of functionality into modules is for illustrative purposes. Alternative embodiments may merge the functionality of multiple software modules into a single module or may impose an alternate decomposition of functionality of modules. For example, a software module for calling sub-modules may be decomposed so that each sub-module performs its function and passes control directly to another sub-module.

The computer-based log file processing system described above is for purposes of example only, and may be implemented in any type of computer system or programming or processing environment, or in a computer program, alone or in conjunction with hardware. It is contemplated that the present invention may be run on a stand-alone computer system, such as the one described above, or may be run from a server computer systems system that can be accessed by a plurality of client computer systems interconnected over an intranet network, or that is accessible to clients over the Internet. In addition, many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries.

Although the present invention has been described in detail, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A method for processing web server logs a session at a time, comprising:
   storing a first plurality of web server requests from different user sessions in a sliding memory window having a programmably controllable size that is smaller than a memory size required to store a stream of raw log file data from which the first plurality of web server requests is selected; and
   identifying and grouping any complete user sessions within the first plurality of web server requests by processing the first plurality of web server requests with the sliding memory window so that at any one time a fraction of the first plurality of web server requests is loaded into the sliding memory window without requiring indexing of the stream of raw log file data.

2. The method of claim 1, further comprising receiving a stream of raw log file data comprising a plurality of web server requests from different user sessions.

3. The method of claim 1, further comprising:
   identifying any incomplete user sessions within the first plurality of web server requests;
   outputting log file entries for each complete user session identified in the first plurality of web server requests; and
   processing log file entries from any incomplete user sessions identified within the first plurality of web server requests for combination with log file entries from any incomplete user sessions identified in the raw log file data.

4. An article of manufacture comprising a computer readable storage medium having stored thereon executable instructions and data which, when executed by at least one processing device, cause the at least one processing device to process web server logs a session at a time by:
   storing a first plurality of web server requests from different user sessions in a sliding memory window having a programmably controllable size that is smaller than a memory size required to store a stream of raw log file data from which the first plurality of web server requests is selected; and
   identifying and grouping any complete user sessions within the first plurality of web server requests by processing the first plurality of web server requests with the sliding memory window so that at any one time a fraction of the first plurality of web server requests is loaded into the sliding memory window without requiring indexing of the stream of raw log file data.

5. The article of manufacture of claim 4, where the executable instructions and data, when executed by at least one processing device, cause the at least one processing device to receive a stream of raw log file data comprising a plurality of substantially chronologically ordered web server requests from different user sessions.

6. The article of manufacture of claim 4, where the executable instructions and data, when executed by at least one processing device, cause the at least one processing device to process web server logs by:
   identifying any incomplete user sessions within the first plurality of web server requests;
   outputting log file entries for each complete user session identified in the first plurality of web server requests; and
   processing log file entries from any incomplete user sessions identified within the first plurality of web server requests for combination with log file entries from any incomplete user sessions identified in the raw log file data.

7. A system for processing web server logs a session at a time using a data processing system and network session data collected from one or more users, the system comprising:
   a log file collection system for storing a first plurality of web server requests from different user sessions in a sliding memory window having a programmably controllable size that is smaller than a memory size required to store a stream of raw log file data from which the first plurality of web server requests is selected; and
   a processing engine to identify and group any complete user sessions within the first plurality of web server requests by processing the first plurality of web server requests with the sliding memory window so that at any one time a fraction of the first plurality of web server requests is loaded into the sliding memory window without requiring indexing of the stream of raw log file data.

8. The system of claim 7, where the log file system receive a stream of raw log file data comprising a plurality of web server requests from different user sessions.

9. The system of claim 7, where the processing engine processes the first plurality of web server requests with the sliding window by:
   reading each log file entry loaded into the sliding window to identify user session information for said log file entry;
   indexing each log file entry to a corresponding user session based on the identified user session information for said log file entry; and
   upon detecting that all log file entries for a complete user session are present in the sliding window, grouping said log file entries for the complete user session within the first plurality of web server requests.

* * * * *